Feb. 8, 1966     E. J. DIEBOLD     3,234,451
HIGH POWER RECTIFIER STRUCTURE
Filed Jan. 5, 1962     3 Sheets-Sheet 1
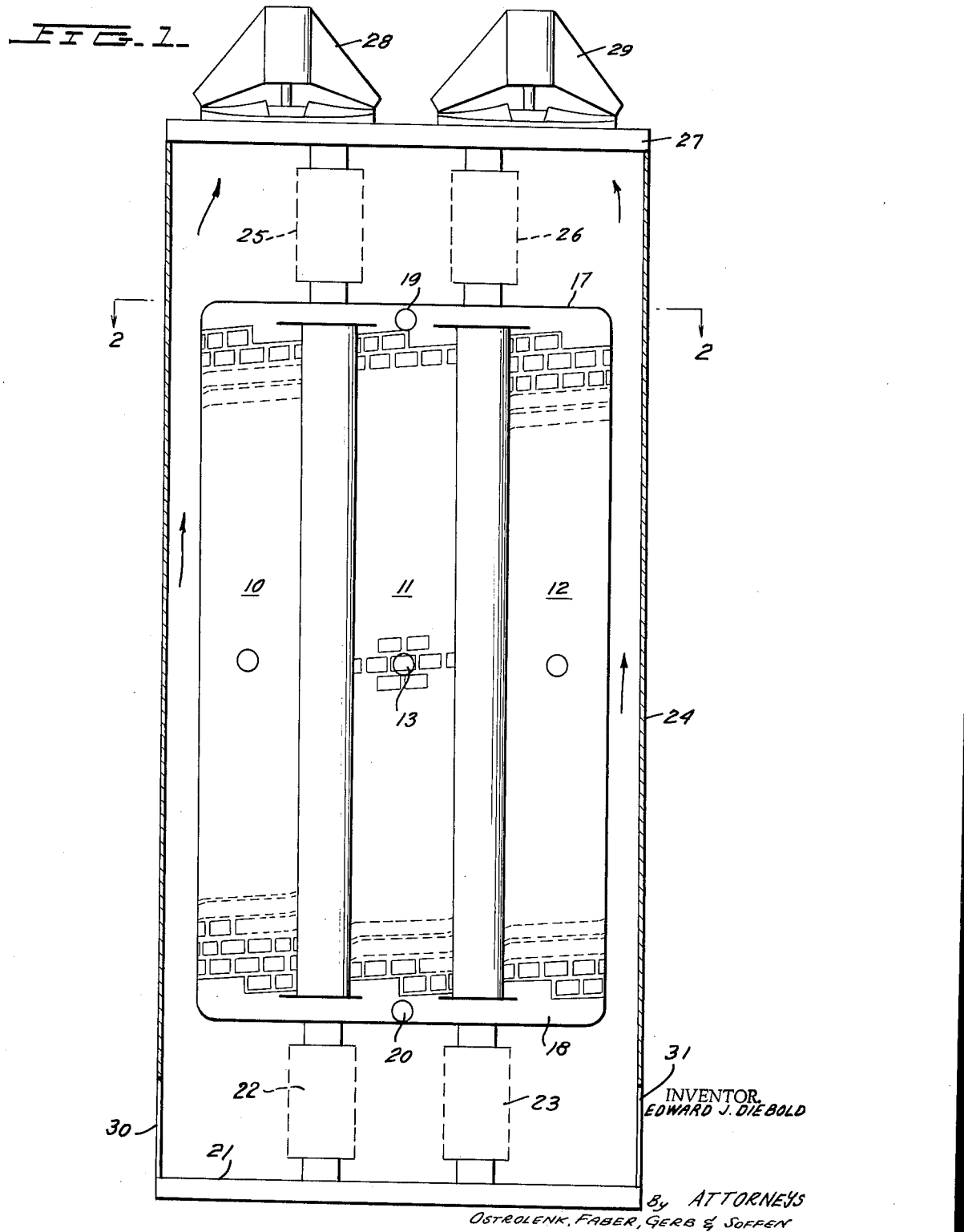
INVENTOR.
EDWARD J. DIEBOLD
By ATTORNEYS
OSTROLENK, FABER, GERB & SOFFEN Feb. 8, 1966 E. J. DIEBOLD 3,234,451
HIGH POWER RECTIFIER STRUCTURE
Filed Jan. 5, 1962 3 Sheets-Sheet 2
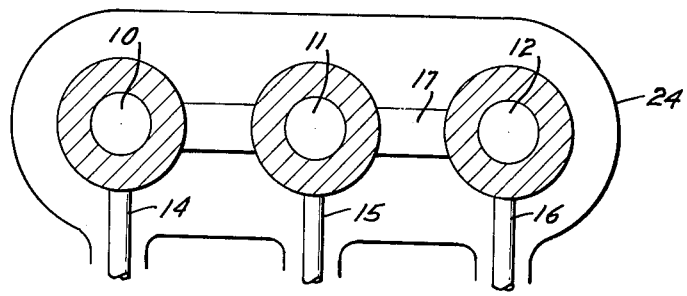
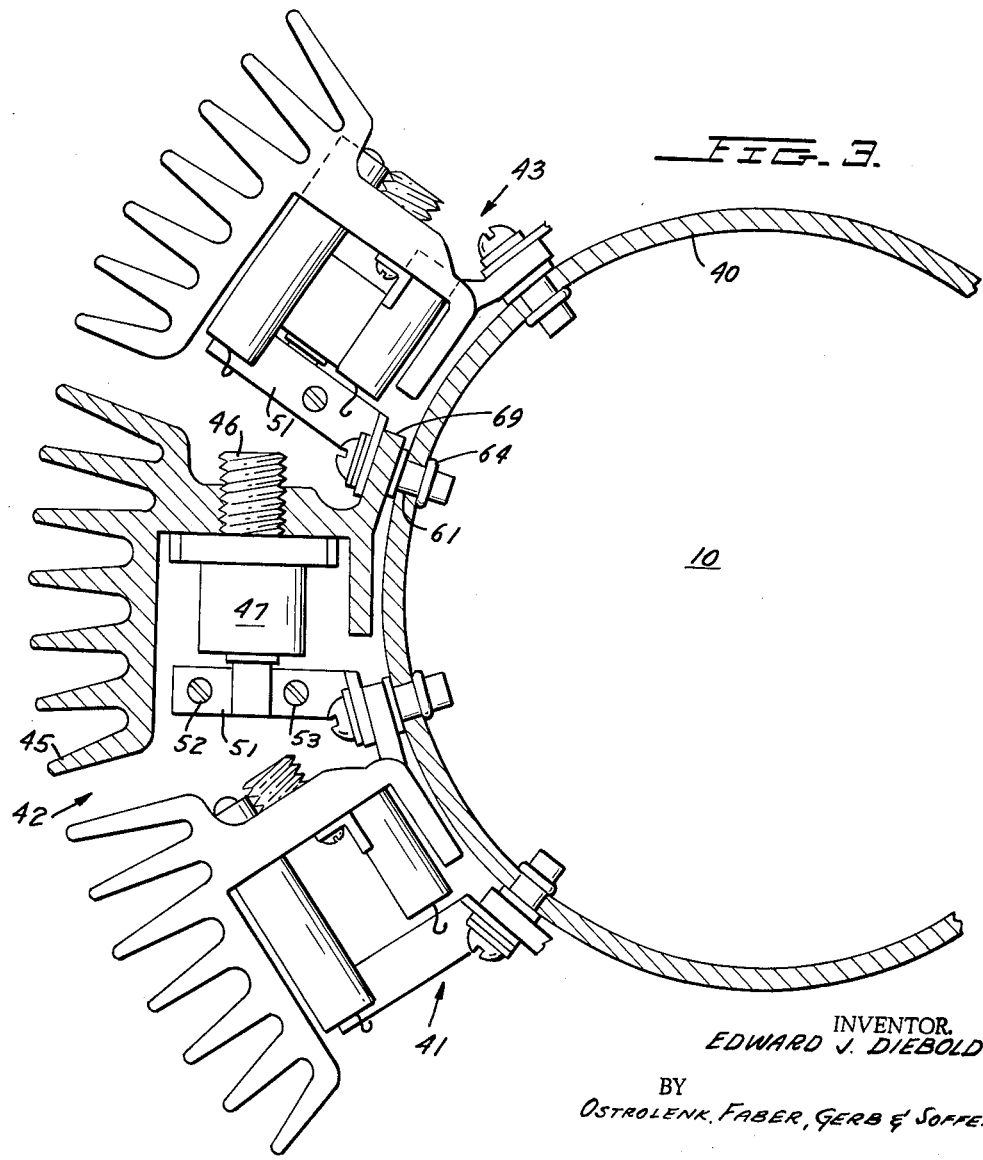
INVENTOR.
EDWARD J. DIEBOLD
BY
OSTROLENK, FABER, GERB & SOFFEN
ATTORNEYS Feb. 8, 1966  E. J. DIEBOLD  3,234,451
HIGH POWER RECTIFIER STRUCTURE
Filed Jan. 5, 1962  3 Sheets-Sheet 3
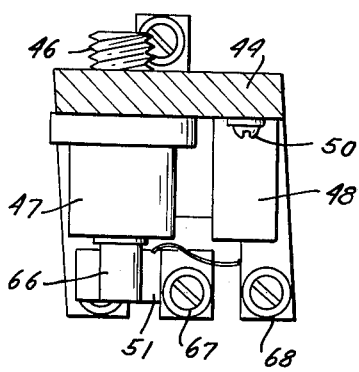
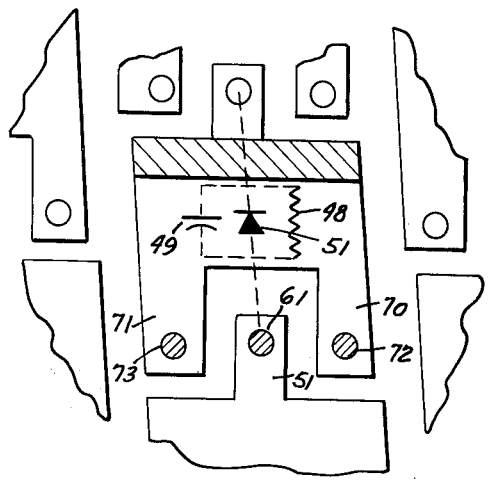
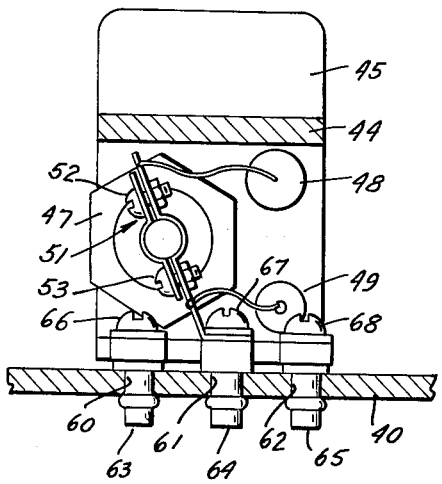
INVENTOR.
EDWARD J. DIEBOLD
BY
OSTROLENK, FABER, GERB & SOFFEN
ATTORNEYS

United States Patent Office 3,234,451
Patented Feb. 8, 1966

3,234,451
HIGH POWER RECTIFIER STRUCTURE
Edward J. Diebold, Palos Verdes Estates, Calif., assignor to International Rectifier Corporation, El Segundo, Calif., a corporation of California
Filed Jan. 5, 1962, Ser. No. 164,569
9 Claims. (Cl. 321—8)

My invention relates to a high power rectifier system comprised of a plurality of series connected rectifier cells, and is an improvement of the structure shown in my copending application Serial No. 34,191, filed June 6, 1960, now Patent No. 3,184,646, entitled "High Voltage Rectifier Stack," assigned to the assignee of the present invention.

In my above noted copending application Serial No. 34,191, now Patent No. 3,184,646, I show a novel manner of assembling a plurality of rectifier-containing modules on an insulating tube and along a helical path on the tube surface.

The present invention relates to an improvement in the module construction and a novel structure for combining the individual columns of that application into a three-phase unit. Thus, three columns, one for each phase, can be supported at their opposite ends by common headers or terminals which serve as D.-C. terminals, while three-phase A.-C. leads are connected to central portions of each of the columns to define a three-phase bridge connected rectifier system. The individual modules are then formed with their external cooling shields being finned to increase the available heat transfer area to improve the cooling of the system. The external ends of the cooling fins are arranged to define a Faraday shield to improve the dynamic characteristics of the entire stack.

Accordingly, a primary object of this invention is to provide a novel high power rectifier system.

Another object of this invention is to provide a novel module construction for a module which contains a rectifier and voltage balancing equipment therefor, wherein the external surface of the module has cooling fins therein.

A further object of this invention is to provide a novel module for rectifier systems wherein the module has cooling fins therein whereby the cooling fins of the modules define a Faraday shield for the entire rectifier assembly.

A further object of this invention is to provide a novel high power rectifier assembly for use in three-phase circuits wherein three columns which carry series connected rectifier elements thereon have identical upper and lower common conductive supports.

These and other objects of my invention will become apparent from the following description when taken in connection with the drawings, in which:

FIGURE 1 shows a side plan view of a rectifier assembly constructed in accordance with the invention with the tank wall removed.

FIGURE 2 is a cross-sectional view of FIGURE 1 taken across the lines 2—2 in FIGURE 1.

FIGURE 3 is a cross-sectional view taken through one of the columns of FIGURE 1 to illustrate the manner in which the modules are mounted on the support tube.

FIGURE 4 is a cross-sectional view of one of the modules of FIGURE 3.

FIGURE 5 is a top view of the module of FIGURE 4.

FIGURE 6 is a view similar to FIGURE 5 of one of the modules to particularly illustrate the configuration of the module body and the manner in which the module body is electrically connected to adjacent module bodies.

Referring first to FIGURE 1, I have illustrated therein a high power rectifier system for use as a three-phase bridge connected rectifier. The rectifier assembly is formed of three columns 10, 11 and 12 which may each be constructed as illustrated in my copending application Serial No. 34,191, now Patent No. 3,184,646. Thus, each of columns 10, 11 and 12 has helically arranged modules carried on an insulation tube where each of the modules includes a rectifier cell and voltage balancing equipment for the rectifier cell. The modules are then connected in series in the helix to define a very high voltage system.

By way of example, and in FIGURE 1, each column may carry 360 identical modules to define a total unit having a rated output of 35,000 volts at 55 amperes. Only a few of the modules are shown in FIGURE 1 for purposes of simplicity, it being understood that the modules continuously wind around the columns to define a complete helix from the bottom of the station to the top of the station.

A central module such as the central module 13 in column 11, as well as similar central modules in columns 10 and 12, are blank modules or modules which do not contain a rectifier element. These modules have electrically connected thereto the A.-C. terminals such as A.-C. terminals 14, 15 and 16 of FIGURE 2. Thus, the upper half of each of the stacks 10, 11 and 12 form three arms of the bridge, while the lower halves of stacks 10, 11 and 12 form the other three arms of the bridge.

Upper and lower headers 17 and 18 respectively then receive the upper and lower portions of each of columns 10, 11 and 12 and define the two D.-C. terminals of the system.

The upper and lower headers are appropriately shaped to shield the modules of the columns from external fields and to prevent excessive voltage gradients at the ends of the columns. The headers 17 and 18 are made of cast aluminum which is preferably anodized to prevent corrosion. The headers 17 and 18 are then appropriately formed as at portions 19 and 20 respectively to receive D.-C. terminals.

The complete assembly of headers and columns is then supported with respect to a floor 21 by means of two identical insulators 22 and 23. The floor 21 could be the bottom of an enclosure tank 24 partially removed in FIGURE 1 to illustrate the internal portions of the tank.

To increase the rigidity of the system, the upper header 17 is provided with further insulators 25 and 26 which may be identical to insulators 22 and 23, and which are secured to the top frame 27 of tank 24.

The top of tank 24 is then provided with two air circulating fans 28 and 29 which draw air through openings such as openings 30 and 31 at the tank bottom for cooling the unit. The direction of air flow is indicated in FIGURE 1 by the arrows. It will be noted particularly in FIGURE 2 that header 17, as well as header 18, has openings in registry with columns 10, 11 and 12 respectively which permits air circulation through the center of the hollow column support for improved cooling.

The manner in which columns 10, 11 and 12 may be fabricated is partially shown in FIGURE 3 for the case of column 10 shown therein in cross-section. The column 10 thus comprises an elongated hollow tube 40 which is a fibreglas-epoxy tube which has the modules of the rectifier assembly helically mounted thereon. In FIGURE 3, I have shown three of these modules, it being understood that the modules surround the tube and helically wind around the surface of the tube. Three of the modules shown are modules 41, 42 and 43 which are, as are all of the modules, of identical construction.

The manner in which each of the modules are constructed is best shown in FIGURES 4, 5 and 6. Referring to FIGURES 4, 5 and 6, the module is formed of a heavy conductive support body 44 which may be constructed of an extruded aluminum bar, and which has cooling fins such as fins 45 on the outer surface thereof. One leg of body 44 has a tapped opening therein which receives the threaded stud 46 of a rectifier cell 47 in both mechanical and electrical engagement.

A resistor and capacitor 48 and 49 respectively are then secured to the body 44 as by screw means such as screw 50 in FIGURE 5 which electrically connects and mechanically secures the ends of resistor 48 and capacitor 49 to body 44. The other ends of the resistor 48 and capacitor 49 are then electrically connected as by soldering to a clamp 51 which is formed of two sections, as best seen in FIGURE 4, having semicircular sections which clamp on the extending head of cell 48 and are clamped by nut and bolt means 52 and 53.

The result, then, is that the rectifier cell 51 is electrically connected in parallel with resistor 48 and capacitor 49, as schematically illustrated in FIGURE 6.

The module bodies are secured to tube 40 by means of three screws. The screw position pattern is best shown, for example, in FIGURE 6 as comprising a series of three aligned openings which wind around the tube body in the helical pattern to be formed. These openings are shown, for example, in FIGURE 6 as openings 60, 61 and 62. The openings such as aligned openings 60, 61 and 62 then receive rivet-type fasteners 63, 64 and 65 respectively which are arranged to receive screws such as screws 66, 67 and 68 respectively.

The body mounting flange, such as flange 69 best shown in FIGURE 3, is formed of a bifurcated section having the two extending legs such as legs 70 and 71, as seen in FIGURE 6. These two extending legs have openings such as openings 72 and 73 (FIGURE 6) which cooperate with fasteners 63 and 65 respectively of FIGURE 4. The central fastener 64 cooperates with an extending leg of clamp 51 of an adjacent module, as is schematically illustrated in FIGURE 6 and as best shown in FIGURE 3, where fastener 61 receives bar 51 of the upper module assembly.

Accordingly, when the modules are mechanically mounted to tube 40, they are automatically electrically connected in their predetermined helical path, as indicated in FIGURE 6. Moreover, individual modules may now be removed and replaced individually without disturbing other modules in the system.

The cooling fins 45 of each of the module assemblies are arranged directly in contact with the rectifier cell, capacitor and shunting resistor, and further serve to act as a corona shield. Thus, all of the modules together in their helical mounted arrangement form a uniform surface shield for the entire column with each shield having a slightly higher potential than the next shield, and each turn of the helix having an increasing potential.

Because of this assembly, all high voltage gradients are eliminated, and all metallic parts are directly fastened to the voltage distributing system formed of the parallel connected resistors and capacitors. Therefore, there are no loose floating potential metallic parts, no high voltage stresses, and no high creepage gradients along the insulation surface of the central tube 40.

The external cooling fins 45 are seen to be oriented in a vertical plane to permit easy cooling by air moving vertically upwards and around the column, as indicated in FIGURE 1. Moreover, and since the cooling fins are oriented symmetrically around the circumference of the column, and protrude to exactly the same radius from the center of the column, they provide mutual shielding for one another in the form of a Faraday screen to prevent individual formation of corona or sparks between the cooling fins and the ambient.

The final assembly, as shown in FIGURE 1, of columns formed in the manner indicated in FIGURES 3 through 6, may then serve the purpose for extremely high power rectifying applications. It is to be noted that the columns 10, 11 and 12 of FIGURE 1 are interchangeable with one another, and are easily replaced by other columns, since the columns are removably clamped within headers 17 and 18.

It is to be further noted that the end modules of columns 10, 11 and 12 are electrically connected to their respective headers by means of the clamps such as clamps 51 which engage appropriate threaded portions of the headers 17 and 18.

Although I have described preferred embodiments of my novel invention, many variations and modifications will now be obvious to those skilled in the art, and I prefer therefore to be limited not by the specific disclosure herein but only by the appended claims.

I claim:

1. A high power rectifier system for transferring energy between a three phase A.-C. system and a D.-C. system comprising a first, second and third rectifier assembly; each of said rectifier assemblies comprising a string of series connected rectifier elements wound in a helical path on an insulation tube; each of said rectifier assemblies being parallel to one another, a first and second conductive header; said first and second conductive headers receiving the upper and lower ends respectively of said rectifier assemblies to provide common conductive terminals and mechanical supports for said rectifier assemblies; said first and second headers forming the D.-C. terminals of said system; each of said rectifier assemblies having A.-C. terminal means for connection to a respective phase of said three-phase A.-C. system.

2. A high power rectifier system for transferring energy between a three phase A.-C. system and a D.-C. system comprising a first, second and third rectifier assembly; each of said rectifier assemblies comprising a string of series connected rectifier elements wound in a helical path on an insulation tube; each of said rectifier assemblies being parallel to one another, a first and second conductive header; said first and second conductive headers receiving the upper and lower ends respectively of said rectifier assemblies to provide common conductive terminals and mechanical supports for said rectifier assemblies; said first and second headers forming the D.-C. terminals of said system; each of said assemblies having centrally located input A.-C. terminals whereby said rectifier system defines a three phase bridge connected rectifier.

3. A high power rectifier system for transferring energy between a three phase A.-C. system and a D.-C. system comprising a first, second and third rectifier assembly; each of said rectifier assemblies comprising a string of series connected rectifier elements wound in a helical path on an insulation tube; each of said rectifier assemblies being parallel to one another, a first and second conductive header; said first and second conductive headers receiving the upper and lower ends respectively of said rectifier assemblies to provide common conductive terminals and mechanical supports for said rectifier assemblies; said insulation tube being hollow; said headers having openings therethrough at positions adjacent said insulation tubes to provide a path for circulation of a constant through the center of said tubes; each of said rectifier assemblies having A.-C. terminal means for connection to a respective phase of said three-phase A.-C. system; said first and second headers forming the D.-C. terminals of said system.

4. A support for a plurality of semi-conductor elements electrically related with respect to one another; said support comprising an elongated member of insulation material; said semi-conductor elements being mechanically connected to the external surface of said elongated member of insulation material; said semi-conductor elements defining a helix around said external surface of said elongated member of insulation material; each of said semi-conductor elements being covered by a respective shield member; said respective shield members having an outer surface extending in a plane parallel to a plane tangent to the said external surface of said elongated member of insulation material; said outer surface of each of said shield members being finned.

5. A support for a plurality of semi-conductor elements electrically related with respect to one another; said support comprising an elongated member of insulation material; said semi-conductor elements being mechanically connected to the external surface of said elongated member of insulation material; said semi-conductor elements defining a helix around said external surface of said elongated member of insulation material; each of said semi-conductor elements being covered by a respective shield member; said respective shield members having an outer surface extending in a plane parallel to a plane tangent to the said external surface of said elongated member of insulation material; said outer surface of each of said shield members being finned; said shields having a relatively large mass to serve as an effective heat sink for its respective semi-conductor element.

6. In combination for a high voltage rectifier stack; an elongated support member of insulation material and a plurality of sub-assemblies including a respective rectifier element to be carried by said elongated member; each of said plurality of sub-assemblies including a support frame, and said respective rectifier element; each of said support frames being of electrically conductive material and being electrically connected to one terminal of its said respective rectifier element; each of said support frames having a connection portion operable to be mechanically connected to said elongated support element; each of said rectifier elements having a conductor extending from its other terminal; each of said sub-assemblies being mounted on said surface of said elongated support member to define a continuous progression of sub-assemblies from one end of said support member to the opposite end of said support member; said conductor extending from said other terminal of said rectifier elements being electrically connected to the said support frame of an adjacent sub-assembly to electrically connect said plurality of sub-assemblies in electrical series; said support frames having a finned exterior surface.

7. In combination for a high voltage rectifier stack; an elongated support member of insulation material and a plurality of sub-assemblies including a respective rectifier element to be carried by said elongated member; each of said plurality of sub-assemblies including a support frame, and said respective rectifier element; each of said support frames being of electrically conductive material and being electrically connected to one terminal of its said respective rectifier element; each of said support frames having a connection portion operable to be mechanically connected to said elongated support element; each of said rectifier elements having a conductor extending from its other terminal; each of said sub-assemblies being mounted on said surface of said elongated support member to define a continuous progression of sub-assemblies from one end of said support member to the opposite end of said support member; said conductor extending from said other terminal of said rectifier elements being electrically connected to the said support frame of an adjacent sub-assembly to electrically connect said plurality of sub-assemblies in electrical series; said support frames having a finned exterior surface; said fins running in the direction of a constant flow along said stack.

8. In combination for a high voltage rectifier stack; an elongated support member of insulation material and a plurality of sub-assemblies including a respective rectifier element to be carried by said elongated member; each of said plurality of sub-assemblies including a support frame, and said respective rectifier element; each of said support frames being of electrically conductive material and being electrically connected to one terminal of its said respective rectifier element; each of said support frames having a connection portion operable to be mechanically connected to said elongated support element; each of said rectifier elements having a conductor extending from its other terminal; each of said sub-assemblies being mounted on said surface of said elongated support member to define a continuous progression of sub-assemblies from one end of said support member to the opposite end of said support member; said conductor extending from said other terminal of said rectifier elements being electrically connected to the said connection portion of the support frame of an adjacent sub-assembly to electrically connect said plurality of sub-assemblies in electrical series; said support members having extending portions partially encircling their said respective rectifier elements to serve as a shield therefor.

9. In combination for a high voltage rectifier stack; an elongated support member of insulation material and a plurality of sub-assemblies including a respective rectifier element to be carried by said elongated member; each of said plurality of sub-assemblies including a support frame, and said respective rectifier element; each of said support frames being of electrically conductive material and being electrically connected to one terminal of its said respective rectifier element; each of said support frames having a connection portion operable to be mechanically connected to said elongated support element; each of said rectifier elements having a conductor extending from its other terminal; each of said sub-assemblies being mounted on said surface of said elongated support member to define a continuous progression of sub-assemblies from one end of said support member to the opposite end of said support member; said conductor extending from said other terminal of said rectifier elements being electrically connected to the said connection portion of the support frame of an adjacent sub-assembly to electrically connect said plurality of sub-assemblies in electrical series; said support members having extending portions partially encircling their said respective rectifier elements to serve as a shield therefor, the external surface of said extending portions being finned.

References Cited by the Examiner

UNITED STATES PATENTS 2,984,773   5/1961   Guldemond et al. ____ 317—234
3,011,105   11/1961  Le Blanc _____ 317—234

FOREIGN PATENTS 877,276   9/1961   Great Britain.

LLOYD McCOLLUM, *Primary Examiner.*